United States Patent [19]

McMillan, Jr. et al.

[11] Patent Number: 5,301,136
[45] Date of Patent: Apr. 5, 1994

[54] METHOD AND APPARATUS FOR FAST IMPLEMENTATION OF INVERSE DISCRETE COSINE TRANSFORM IN A DIGITAL IMAGE PROCESSING SYSTEM USING LOW COST ACCUMULATORS

[75] Inventors: Leonard McMillan, Jr., Apex; Lee A. Westover, Chapel Hill, both of N.C.

[73] Assignee: Sun Microsystems, Inc., Mountain View, Calif.

[21] Appl. No.: 97,584

[22] Filed: Jul. 27, 1993

Related U.S. Application Data

[63] Continuation of Ser. No. 852,969, Mar. 17, 1992, abandoned.

[51] Int. Cl.$^5$ .............................................. G06F 7/38
[52] U.S. Cl. ................................................... 364/725
[58] Field of Search ........................ 364/725, 726, 727

[56] References Cited

U.S. PATENT DOCUMENTS

| | | | |
|---|---|---|---|
| 4,288,858 | 9/1981 | Merola et al. | 364/725 |
| 4,679,163 | 7/1987 | Arnould et al. | 364/725 |
| 4,829,465 | 5/1989 | Knauer et al. | 364/725 |
| 4,841,464 | 6/1989 | Guichard et al. | 364/725 |
| 5,053,985 | 10/1991 | Friedlander et al. | 364/725 |

Primary Examiner—Jerry Smith
Attorney, Agent, or Firm—Blakely Sokoloff Taylor & Zafman

[57] ABSTRACT

In a digital image processing system, a dedicated inverse discrete cosine transform (IDCT) processor comprising a controller and an array of accumulators is provided for performing $n \times n$ inverse discrete cosine transforms. The controller controls the computation of the output vector using a forward mapping procedure. The controller causes k unique kernel values of the reconstruction kernel of each non-zero transform domain coefficient to be selectively accumulated by the array of accumulators, where k equals at most $(n^2+2n)/8$. The array of accumulators comprises accumulator blocks sharing an input and a control line designed to exploit the symmetry characteristics of the reconstruction kernels. Each accumulator block is designed to perform a limited number of distinct operations. The accumulator blocks are logically grouped. P symmetry selection bits and less than an operation configuration selection bits, where $2^q$ equals $n^4/2(p-2)$ are provided on the control line for selecting the appropriate symmetry and operation configuration. As a result, the IDCT can be performed efficiently while keeping the implementation cost of the IDCT processor relatively low.

16 Claims, 5 Drawing Sheets

METHOD AND APPARATUS FOR FAST IMPLEMENTATION OF INVERSE DISCRETE COSINE TRANSFORM IN A DIGITAL IMAGE PROCESSING SYSTEM USING LOW COST ACCUMULATORS

This is a continuation of U.S. application Ser. No. 07/852,969, filed Mar. 17, 1992 now abandoned.

BACKGROUND OF THE INVENTION

1. Field of the Invention

The present invention relates to the field of digital image processing systems, in particular, unitary transforms performed on these systems. More specifically, the present invention relates to very fast implementation of inverse discrete cosine transform.

2. Related Application

The present application is related to U.S. Pat. No. 5,224,062 filed on Mar. 17, 1992, entitled Method and Apparatus for Fast Implementation of Inverse Discrete Cosine Transform on a Digital Image Processing System Using Optimized Lookup Tables, assigned to the assignee of the present invention, Sun Microsystems, Inc. of Mountain View, Calif.

3. Background

In image processing, an image is typically represented as a continuous mathematical function. The continuous representation is either made deterministically or statistically. In a deterministic representation, the point properties of the image are considered, whereas, in a statistical representation, the average properties of the image are specified.

In a digital image processing system, typically the continuous representation, whether deterministic or statistic, is constructed by spatial sampling of the physical image's intensity, photographic density, or other like measurements. The analog results of spatial sampling in turn are quantized into discrete results that are proportional to the amplitude of the digital system. The image is reconstructed by "inverting" the quantized discrete spatial sampling results.

Additionally, various unitary transforms may be performed before the image is reconstructed by inversion. The transforms are performed to extract features such as brightness from images, reducing bandwidth or reducing dimensionality. Since a sequence of images literally goes through tens of thousands of transforms, the speed in which these transforms can be performed is of critical importance. For example, if a sequence of images is to be displayed at 10 frames per second, each image has a frame size of 320×224 pixels divided into 280 macroblocks of 16×16 pixels, and each macroblock has 4 (8×8) luminance values and 2 (8×8) chrominance values, 16,800 inverse transforms (280×6×10) per second will have to be performed on the transformed image data.

The discrete cosine transform has found widespread application because of its ability to decorrelate highly correlated inputs and the discoveries of efficient implementation techniques. The earliest fast implementation techniques for discrete cosine transform were based on approaches originally developed for fast Fourier transform, in which the periodicity and recursive nature of the underlying basis functions were exploited. Later fast were developed by considering various factorizations of the discrete cosine transform's basis matrix.

The structural similarities of inverse discrete cosine transform to discrete cosine transform has enabled each of the fast implementation techniques for cosine discrete transform to be easily adapted to their dual inverse discrete cosine transform. As a consequence, there has been little concentration on specific formulations of the inverse discrete cosine transform, and the unique statistical properties of the transform domain description of the input sequence has largely been ignored.

Thus it is desirable to develop fast implementation techniques for inverse discrete cosine transform exploiting the unique statistical properties of the input sequence. In the related U.S. Pat. No. 5,224,062 a method and an apparatus for performing inverse discrete cosine transform in image processing that do just that was disclosed. As will be disclosed, the present invention provides a method and an apparatus for performing inverse discrete cosine transform in image processing in an even faster manner.

For further description of image processing, see William K. Pratt, *Digital Image Processing*, Wiley Interscience, 1978. For further descriptions of fast implementation techniques for discrete cosine transform, see K. R. Rao and P. Yip, *Discrete Cosine Transforms: Algorithms, Advantages, Applications*, Academic Press, 1990.

SUMMARY OF THE INVENTION

A method and apparatus for very fast implementation of inverse discrete cosine transform (IDCT) on a digital image processing system is disclosed. An inverse discrete cosine transform can be described as the multiplication of an input vector by a constant coefficient linear system matrix to produce an output vector. The input vector is typically sparse, meaning that it is composed primarily of zero-valued transform domain coefficients. The transform domain coefficients are typically quantized, requiring their dequantization before they can be used for calculations. Each system-matrix column vector corresponding to a specific position of the input vector is called a reconstruction kernel.

Under the present invention, a dedicated inverse discrete cosine transform processor is provided to a digital image processing system to compute the N×N output vector of an inverse discrete cosine transform. In its presently preferred embodiment, the dedicated inverse discrete transform processor comprises a controller, an array of random access memory and an N×N array of accumulators.

The controller controls the computation of the N×N output vector using a forward-mapping procedure. That is, the controller causes the matrix product and the output vector to be computed by successive accumulation of each system-matrix column scaled by the non-zero dequantized transform domain coefficient. More specifically, the controller initially causes the N×N array of accumulators to be initialized with zero values. After initialization, the controller causes a quantized transform domain coefficient to be selected from the N×N input vector. If the quantized transform domain coefficient is non-zero, the controller causes the transform domain coefficient to be dequantized and at most $(N^2+2N)/8$ unique kernel values of its scaled reconstruction kernel be determined. Then, the controller causes the at most $(N^2+2N)/8$ unique kernel values to be sequentially and selectively accumulated into the N×N array of accumulators.

In their presently preferred form, the N×N array of accumulators comprises $N^2$ identical accumulator blocks sharing an input and a control line. Each accumulator block is designed to perform a limited number of distinct operations. The limited distinct operations comprise the operations of:

$A_{xy} \leftarrow 1$ $A_{xy} \leftarrow A_{xy}$ $A_{xy} \leftarrow A_{xy} + 1$ $A_{xy} \leftarrow A_{xy} - 1$ Additionally, the accumulator blocks are logically grouped. The accumulator block groups are symmetrical to one another in one of $2^p$ ways. O symmetry selection bits are provided on the control line for selecting the appropriate symmetry. Furthermore, each accumulator block group may be configured one of less than $2^q$ configurations, where q equals $N^2/2(p-1)$. Less the q configuration selection bits are provided on the control line for selecting the appropriate configuration. As a result, the array of $N \times N$ accumulators may be implemented at relatively low cost.

Under the presently preferred embodiment, the controller causes the selected transform coefficient to be dequantized and the at most $(N^2+2N)/8$ unique kernel values of its scaled reconstruction kernel to be determined in one combined step. The controller causes the at most $(N^2+2N)/8$ unique kernel values to be retrieved from a lookup table stored in an array of random access memory corresponding to the selected coefficient's position in the input vector. A total of $N^2$ lookup tables, one for each position of the input vector, is stored in the array of random access memory. The lookup tables dequantize the selected transform domain coefficients and scale their reconstruction kernel values in one combined step.

Additionally, in their presently preferred form, the lookup tables are highly optimized, exploiting the symmetry characteristics of the reconstruction kernels, the inherent properties of quantization, and the statistical attributes of the quantized transform domain coefficients, thereby further reducing the total amount of computations required to inverse transform an image and improving the overall IDCT efficiency of the digital image processing system. Furthermore, each set of the at most $(N^2+2N)/8$ unique kernel values are computed and stored only if they are not currently stored at the time when they are needed.

BRIEF DESCRIPTION OF THE DRAWINGS

The objects, features, and advantages of the present invention will be apparent from the following detailed description of the preferred embodiment of the invention with references to the drawings in which.

DETAILED DESCRIPTION PRESENTLY PREFERRED AND ALTERNATE EMBODIMENTS

A method and apparatus for very fast implementation of inverse discrete cosine transform on a digital image processing system is disclosed. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
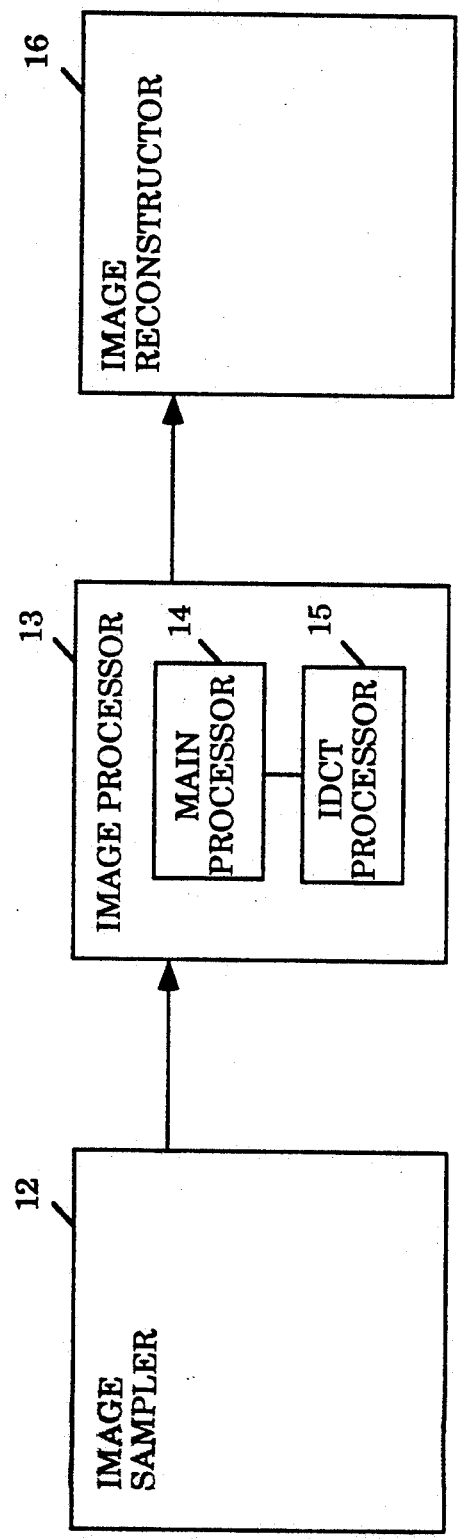
FIG. 1 shows a logical view of an image processing system that incorporates the teachings of the present invention.

Referring now to FIG. 1, a block diagram illustrating a digital image processing system that incorporates the teachings of the present invention is shown. Shown is an image sampler 12 that outputs to a digital image processor 13. The image sampler 12 is used for sampling physical images to generate analog spatial samples for the images. The image sampler 12 is intended to represent a broad category of image sampling devices which are well known in the art and will not be described further.

The digital image processor 13 takes the outputs of the image sampler 12 as inputs and in turn outputs to the image reconstructor 16. The image processor 13 performs quantization to convert the analog samples into discrete samples, unitary transforms including discrete cosine transform, dequantization, and inverse unitary transforms including inverse discrete cosine transform. The digital image processor 13 comprises the main processor 14 and the inverse discrete cosine transform (IDCT) processor 15 which will be described in further detail later with reference to FIGS. 2-5.

The image reconstructor 16 takes the outputs of the image processor 13 as inputs, and in turn outputs the images. The image reconstructor 16 is also intended to represent a broad category of image reconstructors, including raster displays, which are also well known in the art and will not be described further.

Figure 2:
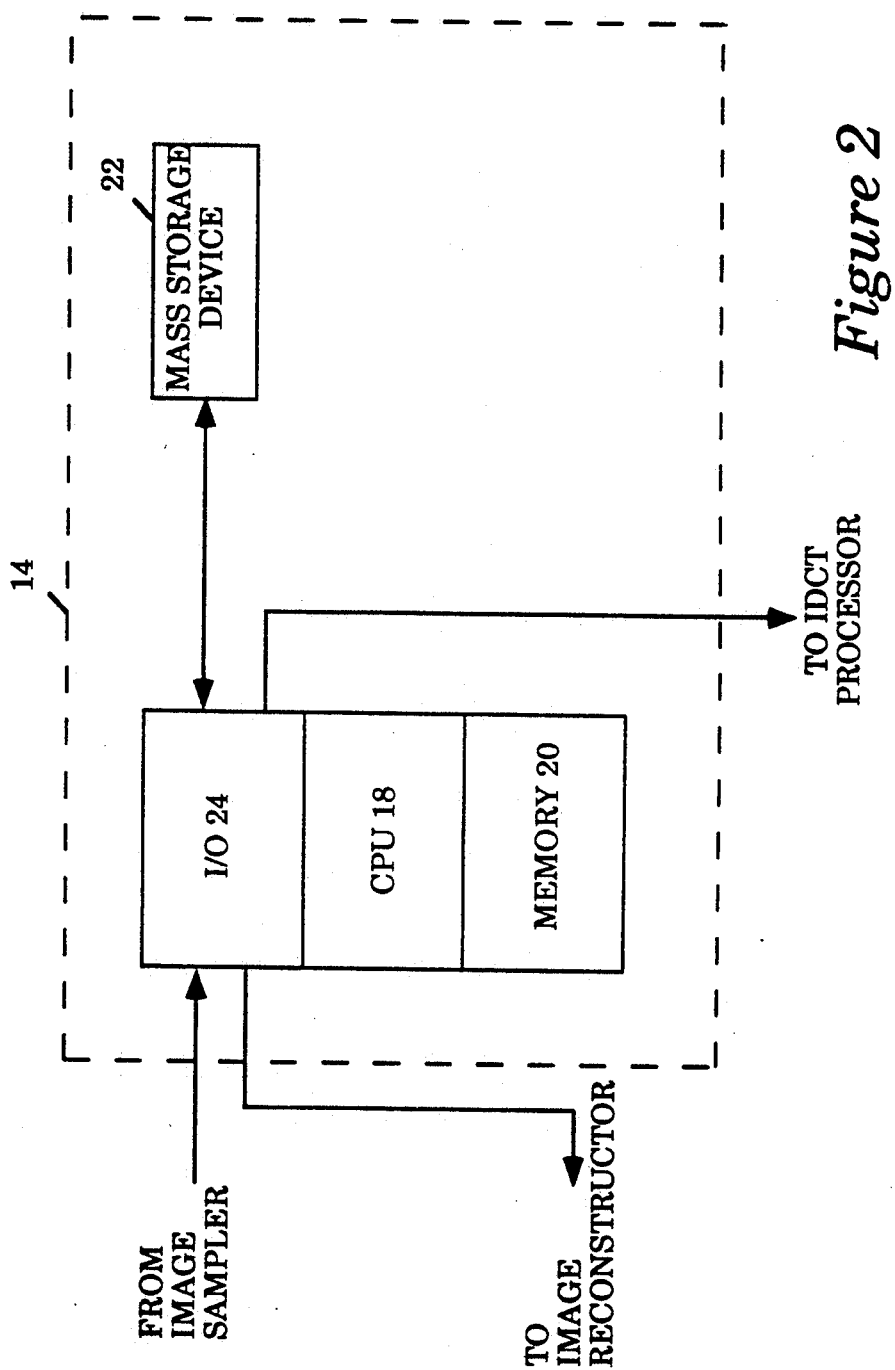
FIG. 2 shows a logical view of the main processor of the image processor of the image processing system illustrated in FIG. 1.

Referring now to FIG. 2, a block diagram illustrating the main processor of the digital image processor illustrated in FIG. 1 is shown. Shown is an input/output (I/O) circuit 24 coupled to a central processing unit (CPU) 18 and a mass storage device 22. The I/O circuit 24 is used to communicate information in appropriately structured form to and from the image sampler, the image reconstructor, the IDCT processor and the mass storage device 22. The I/O circuit 24 is intended to represent a broad category of I/O circuits which are well known in the art and will not be described further.

The CPU 18, in addition to being coupled to the I/O circuit 16, is also coupled to a memory 20. The CPU 18 is used to perform the quantization, unitary transforms including discrete cosine transform, dequantization and inverse unitary transforms except inverse discrete cosine transform. The CPU 18 is also intended to represent a broad category of processors which are well known in the art and will not be described further.

The memory 20 is used to store the working data and the intermediate results of the quantization, unitary transforms including discrete cosine transforms, dequantization and inverse unitary transforms (except inverse discrete cosine transforms), performed by the CPU 16. The memory 20 is also intended to represent a broad category of memory devices which are well known in the art and will not be described further.

The mass storage device 22 is used for storing the analog samples, and the quantized discrete samples. The mass storage device 22 is also intended to represent a broad category of mass storage devices which are well known in the art and will not be described further.

Figure 3:
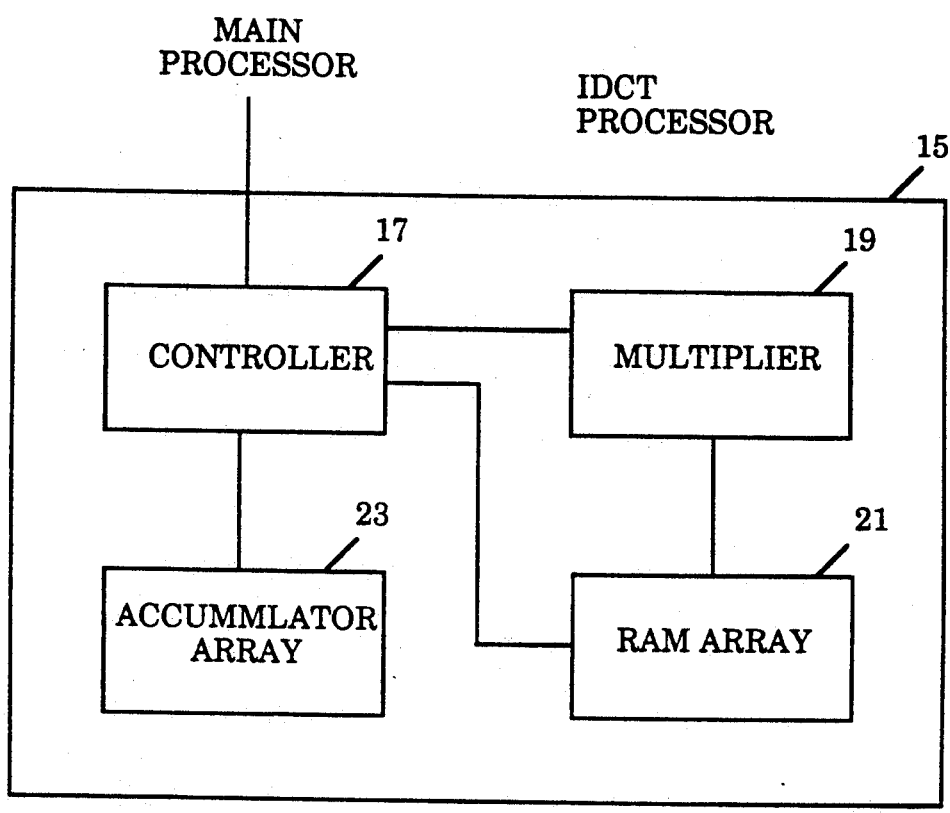
FIG. 3 shows a logical view of the IDCT processor of the present invention.

Referring now to FIG. 3, a block diagram illustrating the inverse discrete cosine transform processor of the present invention is shown. In its presently preferred form, the IDCT processor comprises a controller 17 coupled to an array of random access memory 21 and an array of accumulators 23. The array of random access memory 21 and the array of accumulators 23 are in turn coupled to each other.

The controller 17 is used to control the inverse discrete cosine transform. For a type 11, N×N, two dimensional inverse discrete cosine transform:

$$O(x,y) = \sum_{v=0}^{N-1} \sum_{u=0}^{N-1} f(u)f(v)i(u,v) \times \cos\left(\frac{\pi(2x+1)u}{2N}\right)\cos\left(\frac{\pi(2y+1)v}{2N}\right) \quad (1)$$

where: $x,y: \to [0, N-1]$
and $$f(i) = \begin{cases} \frac{\sqrt{2}}{2} & \text{for } i = 0; \\ 1 & \text{otherwise} \end{cases}$$

The controller 17 controls the inverse transform as a linear system:

$$O = CI, \quad (2)$$

where I and O are $N^2$-dimensional vectors constructed from the row-ordered enumeration of the N×N transformation input sequence, $i(u,v)$, and the reconstructed output sequence, $o(x,y)$, respectively. The system matrix C, is composed of the input weighting terms and is defined as follows:

$$c(yN + x, vN + u) = f(u)f(v) \times \cos\left(\frac{\pi(2x+1)u}{2N}\right)\cos\left(\frac{\pi(2y+1)v}{2N}\right)$$

More specifically, the controller 17 controls the computation of the output vector O in a forward mapping manner, that is, system matrix columns are scaled by the corresponding input values and successively accumulated into the output vector O. For example, $i_{uv}$ scales each element in the $(vN+u)^{th}$ column, $C^{uv}$, of the system matrix and the result is accumulated into the output vector O.
where $$O = \sum_{uv} i_{uv} C^{uv}$$

$$C^{uv} = \begin{bmatrix} C_0^{uv} \\ C_1^{uv} \\ \cdot \\ \cdot \\ \cdot \\ C_M^{uv} \end{bmatrix}$$

with $$C_k^{uv} = f(u)f(v) \times \cos\left(\frac{\pi(2x_k+1)u}{2N}\right)\cos\left(\frac{\pi(2y_k+1)v}{2N}\right)$$

$$y_k = \frac{k}{N} \text{ and } x_k = k \bmod N$$

As a matrix equation, this is written as:

$$\begin{bmatrix} O_{00} \\ O_{01} \\ \cdot \\ \cdot \\ O_{LL} \end{bmatrix} = i_{00}\begin{bmatrix} C_0^{00} \\ C_1^{00} \\ \cdot \\ \cdot \\ C_M^{00} \end{bmatrix} + i_{01}\begin{bmatrix} C_0^{01} \\ C_1^{01} \\ \cdot \\ \cdot \\ C_M^{01} \end{bmatrix} + \ldots + i_{LL}\begin{bmatrix} C_0^{LL} \\ C_1^{LL} \\ \cdot \\ \cdot \\ C_M^{LL} \end{bmatrix}$$

where L, M: $\to [0, N-1]$, and each column matrix is referred as a reconstruction kernen.

How the controller 17 controls the computation of the output vector O using a forward mapping procedure will be described in further detail later with references to FIG. 5.

Still referring to FIG. 3, the array of random access memory 21 is used to stored the working data and the intermediate results of the inverse discrete cosine transforms under the control of the controller 17. In particular, under the presently preferred embodiment, the array of random access memory 21 is used to store a plurality of corresponding lookup tables, one for each position of the input vector, under the control of the controller 17. The array of random access memory 21, except for its storage of the lookup tables, is also intended to represent a broad category of memory devices which are well known in the art and will not be described further.

The corresponding lookup tables are used to dequantize each quantized transform domain coefficient of the input vector and scale its corresponding reconstruction kernel in a combined single step. Each lookup table provides the kernel values of the scaled reconstruction kernel for the quantized transform domain coefficient in its corresponding position of the input vector. By combining dequantizations and scaling into a single table lookup step, the overall IDCT efficiency of the digital image processing system is improved.

Each lookup table comprises a plurality of potential input values and the kernel values for their corresponding scaled reconstruction kernels. The content of the lookup tables are not refreshed from one IDCT to another, thus making the previously computed and stored potential input values and the kernel values of their corresponding reconstruction kernels available for reuse by subsequent IDCTS. Since inverse transforming an image typically requires thousands of transformations, many identical dequantizations and scalings for a series of IDCTs are thereby eliminated, and the overall IDCT efficiency of the digital image processing system is improved.

In their presently preferred form, the corresponding lookup tables are highly optimized, exploiting the symmetry characteristics of the reconstruction kernels, the inherent properties of quantization, and the statistical attributes of the quantized transform domain coefficients, thereby reducing the total amount of computations required to inverse transform an image and improving the overall IDCT efficiency of the digital image processing system.

The optimizations include:

(a) Storing at most $(N^2+2N)/8$ unique kernel values of the scaled reconstruction kernel for each potential input value of an $N \times N$ IDCT in each table, instead of storing all $N^2$ kernel values. All $N^2$ kernel values of the reconstruction kernel may be determined from these at most $(N^2+2N)/8$ unique kernel values stored for the reconstruction kernel.

(b) Storing the at most $(N^2+2N)/8$ unique kernel values of the scaled reconstruction kernel for quantized potential input values in each lookup table, instead of storing the at most $(N^2+2N)/8$ unique kernel values of the scaled reconstruction kernel for the more numerous dequantized potential input values.

(c) Storing the at most $(N^2+2N)/8$ unique kernel values of the scaled reconstruction kernel for only a subset of the quantized potential input values in each lookup table at any particular point in time, and indexing the table locations of each set of potential input value and the at most $(N^2+2N)/8$ unique kernel values for its scaled reconstruction kernel by the least significant bits of the quantized transform domain coefficients.

Additionally, in their presently preferred form, the table values of the lookup tables stored in the array of random access memory 21 are not precalculated. The at most $(N^2+2N)/8$ unique kernel values of the scaled reconstruction kernel for a quantized potential input value are computed and stored into the table in conjunction with the quantized potential input value only if the at most $(N^2+2N)/8$ unique kernel values are needed for a selected quantized transform domain coefficient and they are not stored in the indexed table locations of the corresponding lookup table at the time. The selected quantized transform domain coefficient is dequantized at this time. However, once the unique kernel values are calculated and stored, they are available for reuse by subsequent IDCTs until they are overwritten.

In one embodiment, the controller 17 performs the conditional dequantization of the selected transform domain coefficient and the calculation of the at most $(N^2+2N)/8$ unique kernel values of its reconstruction kernel directly. In an alternate embodiment, the conditional computations are made by a multiplier circuit under the control of the controller 17, the multiplier circuit being coupled to the controller 17 and the array of random access memory 21.

For further description of the optimized lookup tables, see related U.S. Pat. No. 5,224,062, entitled Method and Apparatus for Fast Implementation of Inverse Discrete Cosine Transform In A Digital Image Processing System Using Optimized Lookup Tables.

While the optimized lookup table is a preferred approach for dequantizing the transform domain coefficients and scaling their reconstruction kernel, h will be appreciated the present invention may be practiced with the dequantization and scaling performed in separate steps by the controller 17 directly or by other circuitry under the control of the controller 17.

Still referring to FIG. 3, the array of accumulators 23 is used to compute the output vector O under the control of the controller 17. For each selected transform domain coefficient, k unique kernel values of the scaled reconstruction kernel of the selected transform domain coefficient are provided to the array of accumulators 23 sequentially with the appropriate control signals for selective accumulation, where k is less than or equal to $(N^2+2N)/8$. The array of accumulators 23 is designed to exploit the symmetry characteristics of the reconstruction kernels thereby reducing the complexity of the circuitry and allowing it to be built at relatively low cost.

Figure 4:
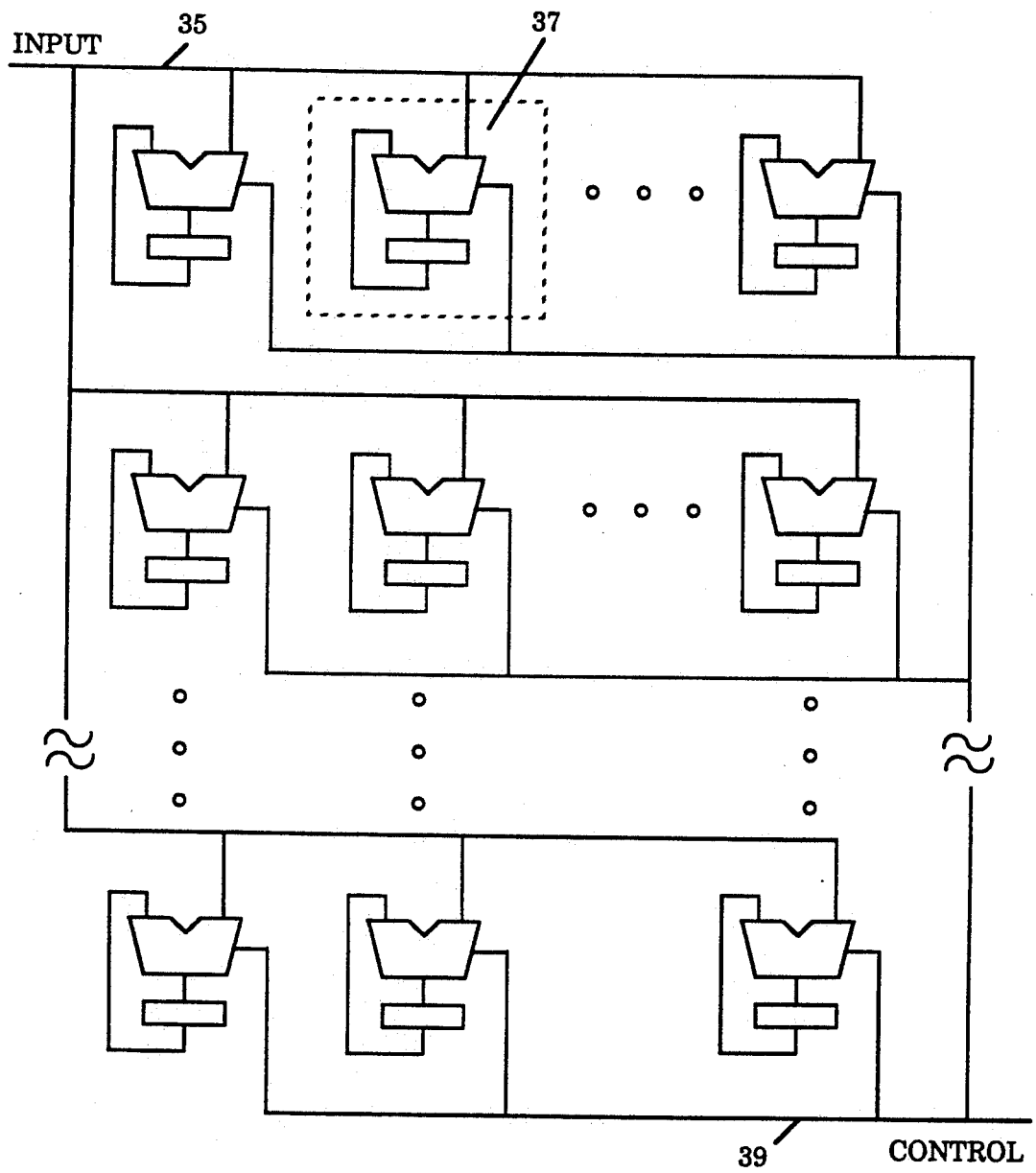
FIG. 4 shows a logical view of the array of accumulators of the present invention.

Referring now to FIG. 4, a block diagram illustrating the array of accumulators of the present invention is shown. The array of accumulators 23 comprises of $N^2$ identical simple accumulator blocks, e.g. 37. All $N^2$ accumulator blocks share the same input line 35, and the same control line 39. Each accumulator block, e.g. 37, is designed to be able to selectively perform any one of only four distinct accumulator operations under the control of the controller:

| | |
|---|---|
| $A_{xy} \leftarrow 1$ | (Load) |
| $A_{xy} \leftarrow A_{xy}$ | (Nop) |
| $A_{xy} \leftarrow A_{xy} + 1$ | (Add) |
| $A_{xy} \leftarrow A_{xy} - 1$ | (Sub) | where $A_{xy}$ denotes the accumulator of row x and column y, and I denotes a scaled unique kernel value provided to the accumulator blocks as input.

Additionally, accumulator blocks, e.g. 37. are logically related to each other in groups, thereby allowing the controller to indicate the accumulator operations for only a subset reference accumulator group, and the accumulator operations of the other accumulators to be implied The accumulator block groups are symmetrical to each other in one of $2^p$ ways. P symmetry selection bits are provided by the controller on the control line to select the appropriate symmetry. For the exemplary $8 \times 8$ case, the accumulator blocks, e.g. 37, are symmetrical to each other by quadrants, i.s. the accumulator blocks are symmetrical to each other in one of four ways. Thus, two symmetry selection bits are provided by the controller to select the appropriate symmetry. The four ways in which the accumulator block groups in the exemplary $8 \times 8$ case are symmetrical to each other are:

$$\begin{bmatrix} Q & H \\ V & D \end{bmatrix} \begin{bmatrix} Q & H \\ V & -D \end{bmatrix}$$

$$\begin{bmatrix} Q & H \\ -V & -D \end{bmatrix} \begin{bmatrix} Q & -H \\ -V & D \end{bmatrix}$$

where

Q is the top left quadrant of the accumulators, and is also used as the referenced group of accumulators, H=Q R,±H is the top right quadrant of the accumulators, V=R Q,± is the bottom left quadrant of the accumulators, D=R Q R,±D is the bottom right quadrant of the accumulators.

and R is the reflection matrix:

$$\begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

Furthermore, the actual accumulator operation configurations within the referenced group of accumulator blocks is substantially less than $2^q$, where $2^q$ equals $N^4$. Less than q accumulator operation configuration selection bits are provided by the controller on the control line for selection of the appropriate accumulator operation configuration. For the exemplary 8×8 case, since the scaled reconstruction kernels can be constructed from 384 unique kernel values as opposed to 4096 kernel values, only 9 accumulator operation configuration identification bits (29=512>384) as opposed to 12 accumulator operation configuration identification bits (212=4096) are provided for accumulator operation configuration selection.

It will be appreciated by limiting the operations performed by each of the accumulator blocks to the four operations described, by sharing input and control lines and providing control signals to the accumulator blocks in the manner described, the array of accumulators of the present invention can be implemented with relatively low cost.

Figure 5:
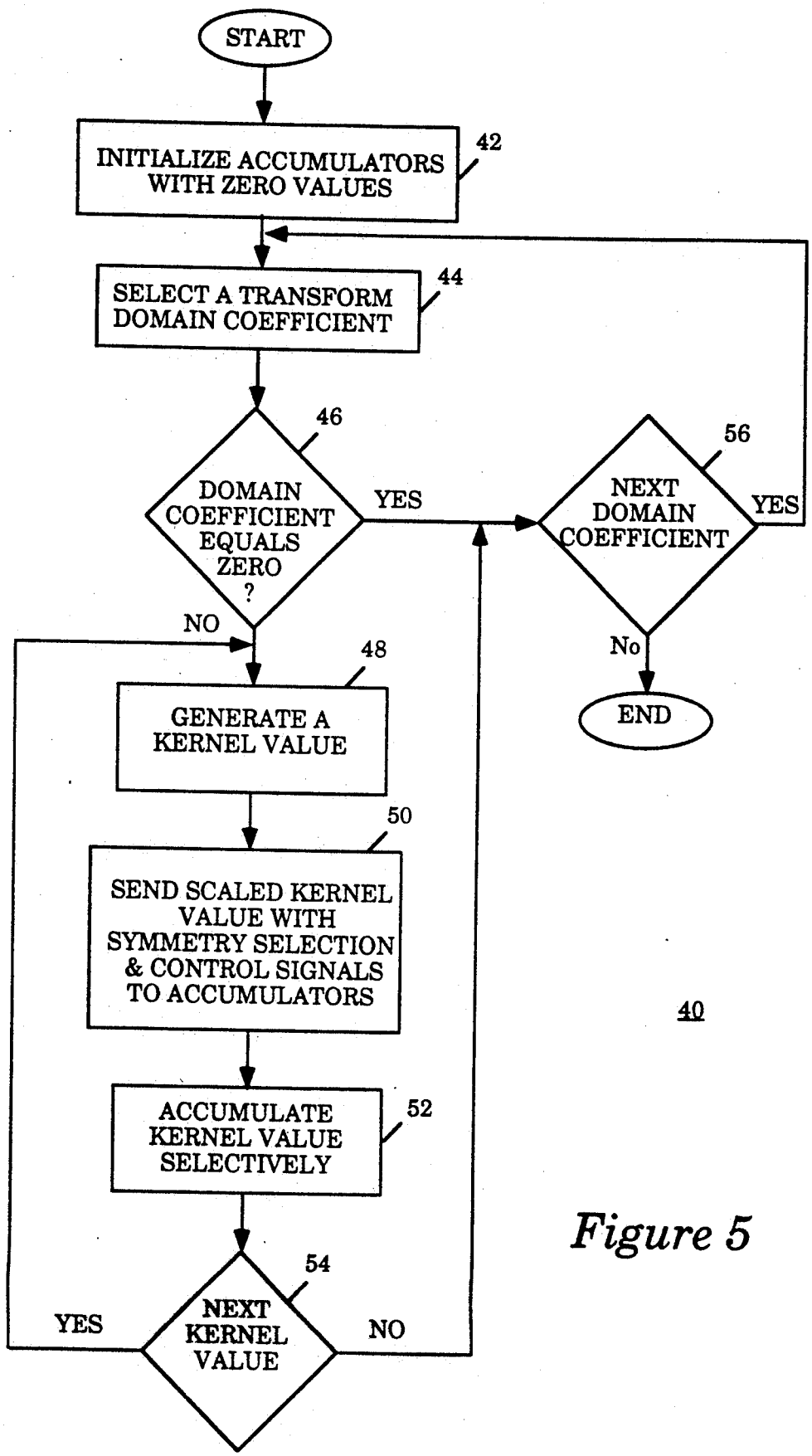
FIG. 5 is a flow chart illustrating the method of the present invention.

Referring now to FIG. 5, a block diagram illustrating the method of the present invention for very fast implementation of inverse discrete cosine transform on a digital image processing system is shown. Initially, the controller causes the array of accumulators to be initialized with zero values, block 42. Next, a transform domain coefficient is selected from the input vector of $N^2$ transform domain coefficients by the controller, block 44. If the selected domain coefficient is non-zero, block 46, the controller causes k unique kernel values to be generated and selectively accumulated in the array of accumulators, blocks 48–52.

Each unique kernel value is generated, block 48, and provided to the array of accumulators with the appropriate symmetry selection and operation configuration selection indicators, block 50. The array of accumulators accumulates each of the unique kernel values accordingly, block 52. Blocks 46–52 are repeated under the control of the controller until all k unique kernel values for the reconstruction kernel of the selected transform domain coefficient have been accumulated.

As described earlier, all $N^2$ kernel values of the reconstruction kernel may be determined from the k unique kernel values, and k equals at most $(N^2 2N)/8$. The unique kernel values may be retrieved from a lookup table, generated by the controller directly, or generated by other circuitry under the control of the controller.

Block 44, and the repetition of blocks 48–52 are then repeated under the control of the controller, once for each of the non-zero transform domain coefficient of the inverse discrete cosine transform. Block 44, and the repetition of blocks 42–52 are skipped for the zero transform domain coefficients of the inverse discrete cosine transform, since zero transform domain coefficients do not contribute to the output vector.

The entire process 40 is then repeated under the control of the controller for each of the inverse discrete cosine transforms that need to be performed for the reconstruction of an image.

In an alternate embodiment, the image quality may be traded off for further improvement in the overall IDCT efficiency of the digital image processing system. Under this alternate embodiment, the number of non-zero valued quantized transform domain coefficients whose scaled reconstruction kernels are accumulated into the output vector may be limited. However, the impact on the image quality may be minimized if the quantized transform domain coefficients in the input vector is processed on a priority basis.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a digital image processing system, a method for efficiently performing inverse discrete cosine transformation (IDCT) on n×n input vectors that has relatively low implementation cost, where n is a power of 2, said method comprising the steps of:

(a) selecting a non-zero quantized transform domain coefficient by a controller of an IDCT processor of an image signal processing subsystem of said digital image processing system from $n^2$ quantized transform domain coefficients of an IDCT input vector, said $n^2$ quantized transform domain coefficients being quantized input values corresponding to a plurality of digitized image signals of an image, said digitized image signals being generated by said image signal processing subsystem using analog image signals received from an image sampling subsystem of said digital image processing system;

(b) generating k kernel values of said selected quantized transform domain coefficient's scaled reconstruction kernel under the control of said controller, where k equals at most $(n^2+2n)/8$;

(c) generating a symmetry selection indicator and an operation configuration selection indicator for each of said generated k kernel values by said controller;

(d) providing each of said generated k kernel values and its corresponding symmetry and operation configuration indicators sequentially to an array of n×n accumulators of said IDCT processor by said controller; and 2. The method as set forth in claim 1, wherein, each of said n×n accumulators is equipped to perform any one of four distinct operations:

| | |
|---|---|
| Axy ← 1 | (Load) |
| Axy ← Axy | (Nop) |
| Axy ← Axy + 1 | (Add) |
| Axy ← Axy − 1 | (Sub) | where $A_{xy}$ denotes the accumulator at row x and column y of said array of n×n accumulators.

3. The method as set forth in claim 2, wherein, sad n×n accumulators are logically grouped into accumulator group symmetrical to each other in one of $2^p$ ways, each of said accumulator group being further operationally configured in one of less than $2^q$ operation configurations, where $2^q$ equals $n^4$, for determining which one of said four distinct operations is to be performed by each of said n×n accumulators for each of said generated unique kernel values;

said symmetry selection indicator comprises p bits indicating one of said $2^p$ symmetries, said operation configuration selection indicator comprises less than q bits indicating one of said less than $2^q$ configurations.

4. The method as set forth in claim 3, wherein, n equals 8;

p equals 2; and said operation configuration selection indicator comprises 9 bits.

5. The method as set forth in claim 4, wherein, the array of 8×8 accumulators are grouped by quadrants, and the accumulator groups are symmetrical to each other in one of four ways as follows:

$$\begin{bmatrix} Q & H \\ V & D \end{bmatrix} \begin{bmatrix} Q & H \\ V & -D \end{bmatrix}$$

$$\begin{bmatrix} Q & H \\ -V & -D \end{bmatrix} \begin{bmatrix} Q & -H \\ -V & D \end{bmatrix}$$

where

W is the top left quadrant of said 8×8 accumulators;

H=Q, R,±H is the top right quadrant of said 8×8 accumulators;

V=R Q,±V is the bottom left quadrant of said 8×8 accumulators;

D=R Q R,±D is the bottom right quadrant of said 8×8 accumulators;

and R is a reflection matrix equaling:

$$\begin{bmatrix} 0 & 0 & 0 & 1 \\ 0 & 0 & 1 & 0 \\ 0 & 1 & 0 & 0 \\ 1 & 0 & 0 & 0 \end{bmatrix}.$$

6. The method as set forth in claim 1, wherein, said steps (a) through (e) are repeated for all non-zero quantized transform domain coefficients of said input vector by said controller of said IDCT processor.

7. The method as set forth in claim 1, wherein, said steps (a) through (e) are repeated for less than all non-zero quantized transform domain coefficients of said input vector by said controller of said IDCT processor.

8. The method as set forth in claim 7, wherein, said steps (a) through (e) are repeated for less than all non-zero quantized transform domain coefficients of said input vector by said controller of said IDCT processor in a priority basis.

9. In a digital image processing system, an inverse discrete cosine transform (IDCT) processor for efficiently performing IDCT on n×n input vectors that has relatively low implementation cost, where n is a power of 2, said IDCT processor comprising:

(a) control and generation means for selecting a non-zero quantized transform domain coefficient from $n^2$ quantized transform domain coefficients of an IDCT input vector, generating k kernel values of said selected quantized transform domain coefficient's scaled reconstruction kernel, where k equals at most $(N^2+2n/8)$, and generating a symmetry selection indicator and an operation configuration selection indicator for each of said generated by k kernel values, said $n^2$ quantized transform domain coefficients being quantized input values corresponding to a plurality of digitized image signals of an image, said digitized image signals being generated by said image signal processing subsystem using analog image signals received from an image sampling subsystem of said digital image processing system;

(b) accumulation means coupled to said control and generation means comprising an array of n×n accumulators for receiving each of said generated k kernel clues sequentially, each of said generated k kernel values being received with its corresponding symmetry and operation configuration selection indicators, and accumulating each of said k kernel values into said n×n accumulators selectively according to said symmetry and operation configuration selection indicators.

10. The IDCT processor as set forth in claim 9, wherein, each of said n×n accumulators is equipped to perform any one of four distinct operations:

| | |
|---|---|
| $A_{xy} \leftarrow 1$ | (Load) |
| $A_{xy} \leftarrow A_{xy}$ | (Nop) |
| $A_{xy} \leftarrow A_{xy} + 1$ | (Add) |
| $A_{xy} \leftarrow A_{xy} - 1$ | (Sub) | where $A_{xy}$ denotes the accumulator at row x and column y of said array of n×n accumulators.

11. The IDCT processor as set forth in claim 10, wherein, said n×n accumulators are logically grouped into accumulator groups symmetrical to each other in one of $2^p$ ways, each of said accumulator group is operationally configured in one of less than $2^q$ operation configurations, where $2^q$ equals $n^4$, for determining which one of said distinct operations is to be performed by each of said n×n accumulators for each of said generated unique kernel values;

said symmetry selection indicator comprises p bits indicating one of said $2^p$ symmetries;

said operation configuration selection indicator comprises less than q bits indicating one of said less than $2^q$ configurations.

12. The IDCT processor as set forth in claim 11, wherein, n equals 8;

p equals 2; and said operation configuration selection indicator comprises 9 bits.

13. The IDCT processor as set forth in claim 12, wherein, the array of 8×8 accumulators are grouped by quadrants, and the accumulator groups are symmetrical to each other in one of four ways as follows:

$$\begin{bmatrix} Q & H \\ V & D \end{bmatrix} \begin{bmatrix} Q & H \\ V & -D \end{bmatrix}$$

-continued $$\begin{bmatrix} Q & H \\ -V & -D \end{bmatrix} \begin{bmatrix} Q & -H \\ -V & D \end{bmatrix}$$

where

Q is the top left quadrant of said 8×8 accumulators;

H=Q, R,±H is the top right quadrant of said 8×8 accumulators;

V=R Q,±V is the bottom left quadrant of said 8×8 accumulators;

D=R Q R,±D is the bottom right quadrant of said 8×8 accumulators;

said R is a reflection matrix equaling:

$$\begin{bmatrix} 0 & 0 & 0 & 1 \\ 0 & 0 & 1 & 0 \\ 0 & 1 & 0 & 0 \\ 1 & 0 & 0 & 0 \end{bmatrix}.$$

14. The IDCT processor as set forth in claim 9, wherein, said control and generation means repeats said selection of transform domain coefficient, said generation of k kernel values and corresponding operation configuration selection indicators for all non-zero quantized transform domain coefficients of said input vector.

15. The IDCT processor as set forth in claim 9, wherein, said control and generation means repeats said selection of transform domain coefficient, said generation of k kernel values and corresponding operation configuration selection indicators for less than all non-zero quantized transform domain coefficients of said input vectors.

16. The IDCT processor as set forth in claim 15, wherein, said control and generation means repeats said selection of transform domain coefficient, said generation of k kernel values and corresponding operation configuration selection indicators for less than all non-zero quantized transform domain coefficients of said input vecotr in a priority basis.

* * * * *

UNITED STATES PATENT AND TRADEMARK OFFICE
CERTIFICATE OF CORRECTION

PATENT NO. : 5,301,136
DATED : April 5, 1994
INVENTOR(S) : McMillan, Jr. et al.

It is certified that error appears in the above-identified patent and that said Letters Patent is hereby corrected as shown below:

In column 10, claim 1 at line 56, please delete " and " and insert -- and
e) accumulating each of said k kernel values selectively by said array of n x n accumulators according to its corresponding symmetry and operation configuration selection indicators. --.

In column 11, claim 3 at line 3, please delete " group " and insert -- groups --.

In column 11, claim 5 at line 34, please delete " W " and insert -- Q --.

In column 14, claim 16 at line 27, please delete " vecotr " and insert -- vector --.

Signed and Sealed this

Twenty-third Day of December, 1997

Attest:

BRUCE LEHMAN

*Attesting Officer*   *Commissioner of Patents and Trademarks*